United States Patent [19]
Kim

[11] Patent Number: 5,982,512
[45] Date of Patent: Nov. 9, 1999

[54] DOCUMENT FEEDER

[75] Inventor: Hyeong-Chae Kim, Yongin-gun, Rep. of Korea

[73] Assignee: Samsung Electronics Co., Ltd., Kyungki, Rep. of Korea

[21] Appl. No.: 08/854,720

[22] Filed: May 12, 1997

[30] Foreign Application Priority Data

May 15, 1996 [KR] Rep. of Korea ........................ 96-12044

[51] Int. Cl.[6] ........................................... H04N 1/04
[52] U.S. Cl. ........................... 358/498; 358/496; 358/483
[58] Field of Search .................... 358/498, 496, 358/474, 400, 401, 471, 482, 483, 488; 250/208.1, 234–236; 271/314, 315, 10.09, 109

[56] References Cited

U.S. PATENT DOCUMENTS

| | | | |
|---|---|---|---|
| 4,953,037 | 8/1990 | Ito et al. | 358/496 |
| 4,970,606 | 11/1990 | Shima | 358/494 |
| 5,077,618 | 12/1991 | Sakai et al. | 358/498 |
| 5,267,058 | 11/1993 | Sata | 358/498 |
| 5,278,677 | 1/1994 | Lee et al. | 358/498 |
| 5,379,121 | 1/1995 | Yamada et al. | 358/400 |
| 5,399,850 | 3/1995 | Nagatani et al. | 250/208.1 |
| 5,448,374 | 9/1995 | Yokoyama et al. | 358/400 |
| 5,504,586 | 4/1996 | Garcia et al. | 358/400 |
| 5,510,909 | 4/1996 | Morikawa et al. | 358/498 |
| 5,517,332 | 5/1996 | Barry et al. | 358/496 |
| 5,519,512 | 5/1996 | Bandai et al. | 358/474 |
| 5,579,128 | 11/1996 | Cheng | 358/496 |
| 5,579,129 | 11/1996 | Iwata et al. | 358/474 |
| 5,621,544 | 4/1997 | Ogura et al. | 358/496 |
| 5,739,925 | 4/1998 | Kameyama et al. | 358/496 |
| 5,805,307 | 9/1998 | Park | 358/483 |

*Primary Examiner*—Edward L. Coles
*Assistant Examiner*—Cheukfan Lee
*Attorney, Agent, or Firm*—Robert E. Bushnell, Esq.

[57] ABSTRACT

A document feeder for a facsimile machine includes: a reading roller for a document reading unit, a shaft about which the roller rotates, a hollow rubber roller through which the shaft is located, an elastic rubber cylinder of a predetermined length mounted inside the rubber tube at the center, and a pair of levers each having a bushing to support the shaft and an eccentric cam inserted into each hole of the frames to separate the reading roller from the document reading section thereby connecting the reading roller to the frames. Brackets are attached to both ends of the document reading section to connect the document reading section to the frames. Elastic members are mounted under a center of the document reading section and support the document reading section, thereby keeping the reading roller's right and left sides in proper contact with a document reading section.

19 Claims, 3 Drawing Sheets

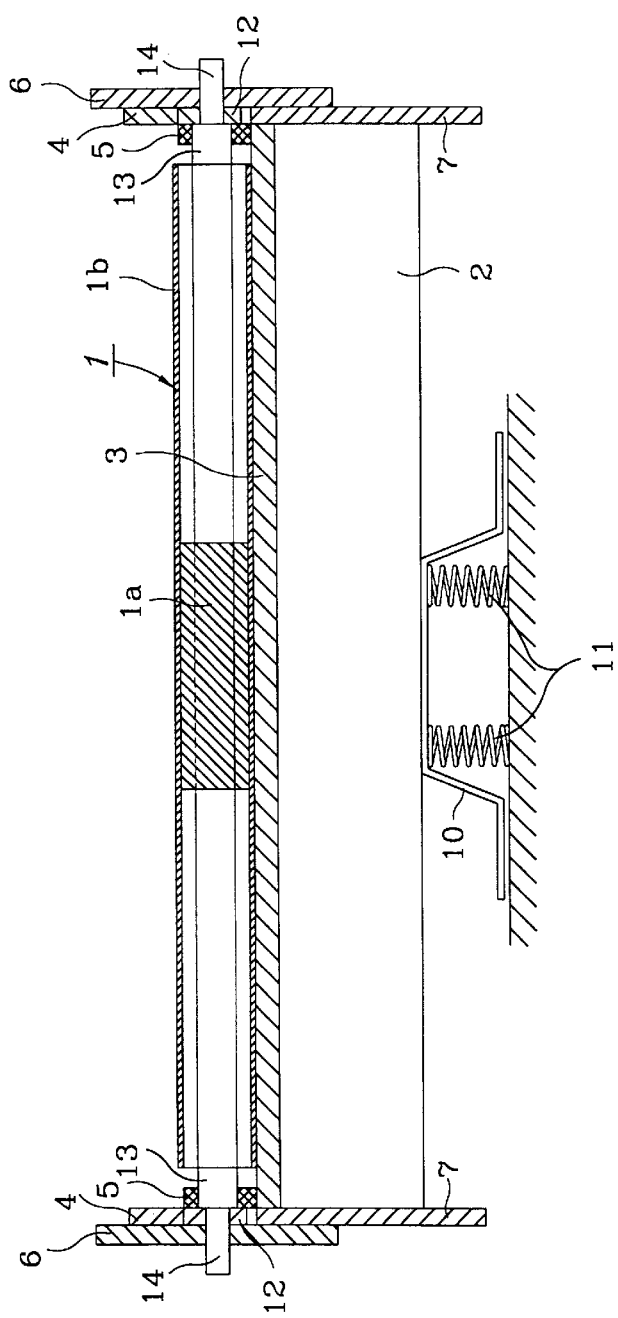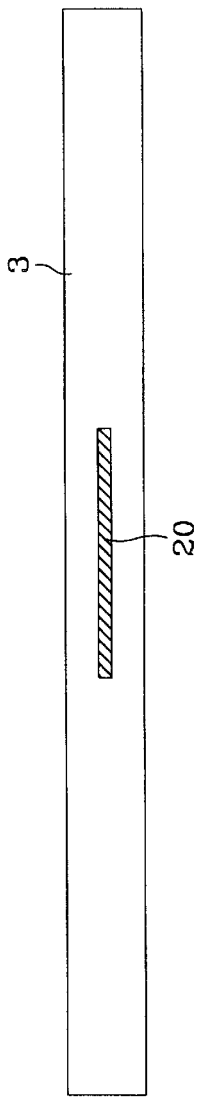

DOCUMENT FEEDER

This application makes reference to, incorporates the same herein, and claims all benefits accruing under 35 U.S.C. §119 from an application for DOCUMENT FEEDER FOR A FACSIMILE MACHINE earlier filed in the Korean Industrial Property Office on the 15$^{th}$ day of May 1996 and there duly assigned Ser. No. 12044/1996, a copy of which application is annexed hereto.

BACKGROUND OF THE INVENTION

1. Field of the Invention

The present invention generally relates to a document feeder for a facsimile machine, for example. More particularly, it relates to a document feeder for a facsimile machine which can feed a document into the facsimile machine without drawing it to the right or left.

2. Description of the Related Art

Office automation machines such as facsimile machines, photocopiers, printers, etc. are pervasive in the industrialized world, greatly improving efficiency. Since the use of these devices in homes as well as offices is increasing, manufacturers have been developing low-priced office automation machines equipped with various functions to meet the demand of buyers. Two objectives of current research and development is the development of machines which save space and lower production costs.

In line with this trend, a presently-available facsimile machine is designed to operate with just two or three rollers. The reading roller also serves as a compression roller, a write roller, and a paper output roller, and is used for the low-priced systems. A document to be sent is moved by a document feed roller and pressed against a reading glass so that the document is scanned by a document reading section. When a cylindrical reading roller rotates, the document is conveyed to the facsimile printing head. At this point, the right and left sides of the reading roller equally contact the document reading section.

When the reading roller is made of rubber and its outer circumference is not even throughout the length of the roller, the document is drawn toward the larger end of the reading roller, causing the document to be off-centered. For example, when the circumference at a contact area, towards the left end of reading roller in contact with the document reading section, is larger the circumference of the roller towards the right end the document moves to the left. If the contact area towards the right has a larger circumference than the left end of the roller where the reading roller contacts the document reading section, the document moves to the right.

The following patents each disclose feature of the present invention but do not teach or suggest the specifically recited document feeder of the present invention in which an elastic means is mounted at the center of the document reading section in accordance with the present invention.

U.S. Pat. No. 4,953,037 to Ito et al, entitled Original Reading Apparatus, U.S. Pat. No. 5,077,618 to Sakai et al., entitled Image Data Processing Apparatus, U.S. Pat. No. 5,267,058 to Sata, entitled Original Feeding And Reading Apparatus In Which The Original Is Pressed Against The Image Sensor, U.S. Pat. No. 5,278,677 to Lee et al., entitled Device For Removing Document Jamming Generated At A Transmitter Of A Facsimile Using A Contact Image Sensor, U.S. Pat. No. 5,379,121 to Yamada et al., entitled Portable Facsimile Apparatus, U.S. Pat. No. 5,448,374 to Yokoyama et al., entitled Facsimile Apparatus And Roll-Like Sheet Holder, U.S. Pat. No. 5,504,586 to Garcia et al., entitled Method And Device For Placing Of drive Counter-Rolls Under Pressure In A Machine Such As A Facsimile Machine, U.S. Pat. No. 5,510,909 to Morikawa et al., entitled Image Reading Apparatus Having A Paper Guide Mechanism With Spring Biased Locking Releasing Pieces Connected By Symmetrical Movement And Locking Mechanisms, U.S. Pat. No. 5,517,332 to Barry et al., entitled Document Scanner Having One-Piece Housing For Holding An Image Sensor, Drive Roller And Document Sensors In Close Alignment With Each Other, and U.S. Pat. No. 5,519,512 to Bandai et al., entitled Facsimile Apparatus Having Reduced Profile.

SUMMARY OF THE INVENTION

It is an object of the present invention to provide a document feeder for a facsimile machine, for example, which can prevent a document to be sent from being drawn to the right or left.

It is another object of the present invention to provide a document feeder for a facsimile machine, for example, which can prevent a document from being sent off-centered by using a reading roller which insures that the center of the roller is firmly pressed against the document reading section, thereby enhancing the facsimile machine's document transmission function and reliability.

In order to realize the above objectives, the present invention involves a document feeder for a facsimile machine, for example, including a support member joined to a reading roller's shaft so as to make the reading roller's right and left sides properly contact a document reading section on the basis of a document reading unit's center. The support member is supported by the document reading section.

Another aspect of the present invention is that the present invention provides a document feeder for a facsimile machine, for example, including: a reading roller for a document reading unit, a shaft about which the roller rotates, a hollow rubber roller through which the shaft is located, an elastic rubber cylinder of a predetermined length mounted inside the rubber tube at the center, and a pair of levers each having a bushing to support the shaft and an eccentric cam inserted into each hole of the frames to separate the reading roller from the document reading section, thereby connecting the reading roller to the frames. Brackets are attached to both ends of the document reading section to connect the document reading section to the frames. Elastic members are mounted under the document reading section and support the document reading section, thereby keeping the reading roller's right and left sides in proper contact with a document reading section.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIGS. 3A and 3B are sectional views of the inventive document feeder for a facsimile machine.

DETAILED DESCRIPTION OF THE PREFERRED EMBODIMENT

Reference will now be made in detail to the preferred embodiment of the present invention, examples of which are illustrated in the accompanying drawings.

Figure 1A:
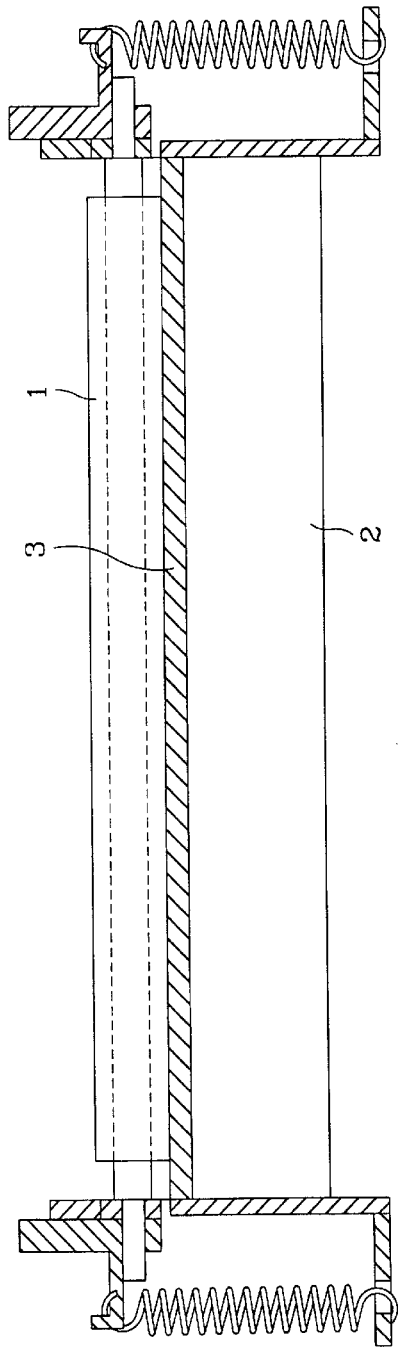
FIG. 1A depicts a flat reading roller.

FIG. 1A illustrates the flat reading roller described in the Description of the Related Art. A document to be sent is moved by a document feed roller (not illustrated) and pressed against a reading glass 3 so that the document is scanned by a document reading section 2. When a cylindrical reading roller 1 rotates, the document is conveyed to the facsimile printing head (not shown). The right and left sides of the reading roller 1 equally contact the document reading section 2.

Figure 1B:
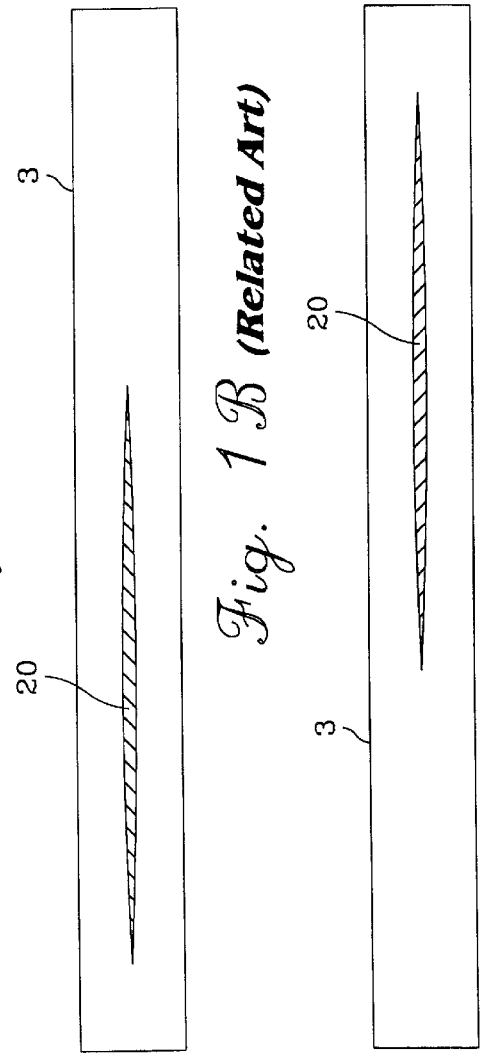
FIGS. 1B and 1C each depict left and right areas where the reading roller contacts a document reading section.
Figure 1C:

When the reading roller 1 is made of rubber and its outer circumference is not even throughout the length of the roller, the document is drawn toward the larger end of the reading roller 1 causing the document to be off centered. For example, when the circumference at a contact area 20 toward the left end of the reading roller 1 in contact with the document reading section 2 is larger than the circumference of the roller toward the right end, as shown in FIG. 1B, the document moves to the left. If the contact area toward the right area 20' has a larger circumference than the left end of the roller where the reading roller 1 contacts the document reading section 2, as shown in FIG. 1C, the document moves to the right.

Figure 2:
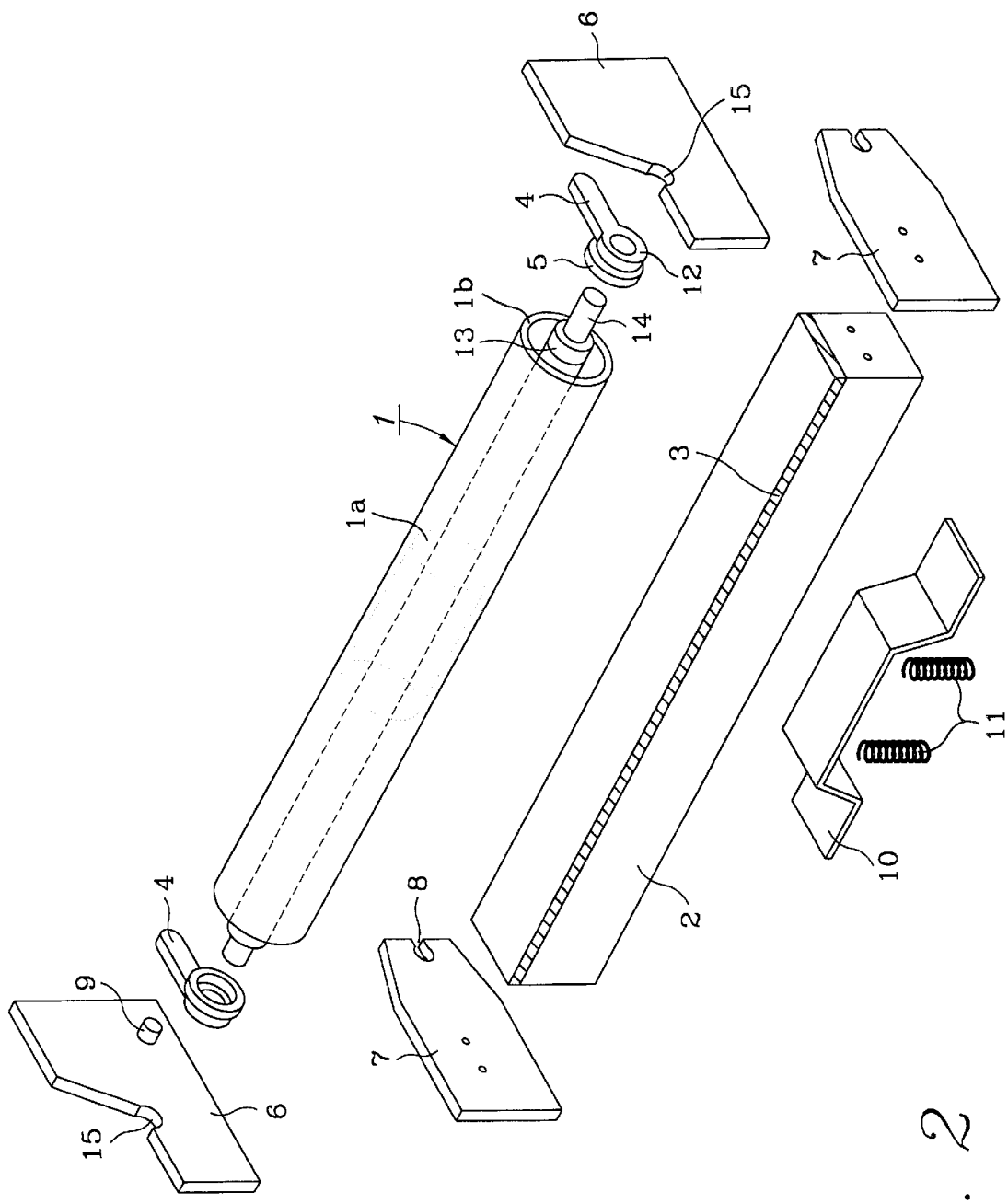
FIG. 2 is an exploded-perspective view of a document feeder for a facsimile machine in accordance with the present invention.

FIG. 2 is an exploded-perspective view of a document feeder for a facsimile machine in accordance with the present invention, and FIGS. 3A, 3B and 3C are sectional views of the inventive document feeder for a facsimile machine.

A document reading section 2 includes a contact image sensor (CIS). A reading glass 3 is located on the top surface of the document reading section 2 to prevent the contact image sensor from being stained or damaged by dirt and dust. Brackets 7 are attached to both ends of document reading section 2. Each bracket 7 has a circular slot 8 on one side, and frames 6 have protruding pins 9 that are attached securely to the frames so that the pins can be inserted into slots 8 so that document reading section is connected to frames 6.

The reading roller 1 has rubber tube 1b, elastic rubber cylinder 1a of a predetermined length located inside hollow tube 1b at the center, and shafts 13 and 14 running through the center of rubber tube 1b. Reading roller 1's center is firmly pressed against document reading section 2 so that contact area 20 is formed on its center (FIG. 3b). A lever 4, having bushing 5 and eccentric cam 12, is attached to each end of shafts 13 and 14, and is inserted into holes 15 on either side of frames 6, whereby reading roller 1 is connected to frames 6 at both ends. This lever 4 serves to determine a document scanning level. Either a plate spring, 10, or some compression coil springs 11 are located under the document reading section 2 to press the reading glass 3 against the reading roller 1. These springs are supported by a frame or housing. Both a plate spring and compression coil springs may be employed at the same time, or just the plate spring 10, according to the structure of the facsimile machine reading unit. Otherwise, one or more compression coil springs 11, may be mounted around the contact image sensor's center.

Referring to FIGS. 3A and 3B, the effect and advantage of the inventive facsimile are now described.

The top edge of a document, which is moved by a document feed roller (not illustrated), is located on reading glass 3, that covers document reading section 2. Once the document is detected by a sensor (not shown), reading roller 1 rotates. Both ends of shaft 13, about which the reading roller 1 rotates, are joined to levers 4 containing eccentric cams 12 and bushings 5 that assist reading roller 1's center in firmly pressing against document reading section 2, without drawing to the right or left.

While frames 6 are joined to small shaft 14 protruding from shaft 13, reading roller 1's inner elastic rubber cylinder 1a presses against reading glass 3 acting against plate spring 10 or compression coil springs 11, so that the document is scanned by document reading section 2. The scanned document is discharged by the rotation of reading roller 1. In other words, inner elastic rubber cylinder 1a of a predetermined length is formed inside rubber tube 1b's center, so that reading roller 1 is firmly pressed against document reading section 2, and the right and left edges lightly press against reading section 2 for document scanning. FIG. 3B shows contact area 20 created on the center of reading glass 3 when reading roller 1 contacts reading glass 3.

According to the present invention, the reading roller's center firmly presses against the document reading section, and the right and left sides of the reading roller lightly press against the document reading section owing to the reading roller's rubber tube. Since the document is firmly pressed against the center of the document reading section, it is moved without drawing to one side. Additionally, the plate spring or compression coil springs are located under the contact image sensor to assist the reading roller's center in firmly pressing against the document reading section, thereby preventing the document from being off-centered. Therefore, the present invention may ensure optimum document feeding performance.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A document feeder comprising:
 a support means joined to a reading roller's shaft so as to make the reading roller's right and left sides properly contact a document reading section on the basis of a document reading unit's center, said support means being supported by said document reading section; and
 an elastic means mounted under a center of the document reading section so as to press the reading section against the reading roller so that a contact area is created on a center of the reading roller by the elastic force of the elastic means and said support means including a pair of levers each with a bushing to support the shaft and an eccentric cam, which respectively act against each one of a pair of frames so as to separate the reading roller from the document reading section as the frames and levers rotate, each of said cams contacting the document reading section's reading glass to allow the reading roller to contact the document reading section uniformly.

2. A document feeder according to claim 1, said elastic means comprising at least one of a plate spring or at least one compression coil spring so that a contact area is created on at reading roller's center by the elastic force thereof.

3. A document feeder according to claim 1, said elastic means comprising a U-shaped plate spring having its center contacting the center of the reading section.

4. A document feeder according to claim 3, said elastic means further comprising a pair of compression coil springs disposed under said U-shaped plate spring to further urge said U-shaped plate spring into the reading section.

5. A document feeder comprising:

a support means joined to a reading roller's shaft so as to make the reading roller's right and left sides properly contact a document reading section on the basis of a document reading unit's center, said support means being supported by said document reading section; and an elastic means mounted under a center of the document reading section so as to press the reading section against the reading roller so that a contact area is created on a center of the reading roller by the elastic force of the elastic means and further comprising brackets fastened to both ends of the document reading section and having rounded slots into which pins protruding from frames of the document reading section mate with to act as hinges so that the document reading section acts against the roller.

6. A document feeder according to claim 5, said elastic means comprising a U-shaped plate spring having its center contacting the center of the reading section.

7. A document feeder according to claim 6, said elastic means further comprising a pair of compression coil springs disposed under said U-shaped plate spring to further urge said U-shaped plate spring into the reading section.

8. A document feeder according to claim 5, said elastic means comprising at least one of a plate spring or at least one compression coil spring so that a contact area is created on at reading roller's center by the elastic force thereof.

9. A document feeder comprising:

a reading roller of a document reading unit having a shaft about which the roller rotates, a rubber tube through which the shaft rotates, and an elastic rubber cylinder of a predetermined length mounted inside the rubber tube's center and attached to the shaft;

a pair of members each having a bushing on which the shaft rotates and another member inserted into holes in a pair of frames for separating the reading roller from a document reading section, thereby connecting the reading roller to the frames, and brackets being attached to the ends of the document reading section so as to connect the document reading section to the frames; and an elastic means mounted under for supporting the document reading section, thereby keeping the reading roller's right and left sides in proper contact with the document reading section.

10. A document feeder according to claim 9, said reading roller pressing firmly against the document reading unit at the center thereof and less firmly at the right and left edges thereof.

11. A document feeder according to claim 10, said elastic means comprising a U-shaped plate spring having its center contacting the center of the reading section.

12. A document feeder according to claim 11, said elastic means further comprising a pair of compression coil springs disposed under said U-shaped plate spring to further urge said U-shaped plate spring into the reading section.

13. A document feeder according to claim 9, said brackets attached to both ends of said document reading section further having rounded slots into which protruding pins attached to the frames act as hinges so that the document reading section moves against the reading roller.

14. A document feeder according to claim 13, said elastic means comprising a U-shaped plate spring having its center contacting the center of the reading section.

15. A document feeder according to claim 14, said elastic means further comprising a pair of compression coil springs disposed under said U-shaped plate spring to further urge said U-shaped plate spring into the reading section.

16. A document feeder according to claim 9, said elastic means comprising at least one of a plate spring or at least one compression coil spring serves so that a contact area is created on the reading roller's center by the elastic force thereof.

17. A document feeder according to claim 9, said elastic means comprising a U-shaped plate spring having its center contacting the center of the reading section.

18. A document feeder according to claim 17, said elastic means further comprising a pair of compression coil springs disposed under said U-shaped plate spring to further urge said U-shaped plate spring into the reading section.

19. A document feeder according to claim 9, said pair of members comprising a pair of levers and said another member comprising a cam.

* * * * *